United States Patent [19]

Craft

[11] Patent Number: 4,841,395
[45] Date of Patent: Jun. 20, 1989

[54] STATIC ELECTRICITY DISCHARGE DEVICE FOR A MAGNETIC HEAD

[75] Inventor: David C. Craft, Eden Prairie, Minn.

[73] Assignee: Magnetic Peripherals Inc., Minnetonka, Minn.

[21] Appl. No.: 171,052

[22] Filed: Mar. 21, 1988

[51] Int. Cl.[4] .......................... G11B 5/60; G11B 5/147
[52] U.S. Cl. ...................................... 360/103; 360/126; 360/128
[58] Field of Search ................ 360/103, 126, 128, 110

[56] References Cited

U.S. PATENT DOCUMENTS 4,317,149  2/1982  Elser .................................... 360/126

Primary Examiner—A. J. Heinz
Attorney, Agent, or Firm—Edward P. Heller

[57] ABSTRACT

A static electricity discharge device for a magnetic head formed by providing a recess to expose one of the conductors connected to the head's magnetic circuits. Static electricity buildup on the conductors discharges through the exposed portion of the conductor rather than through the pole pieces of the magnetic circuits.

4 Claims, 4 Drawing Sheets

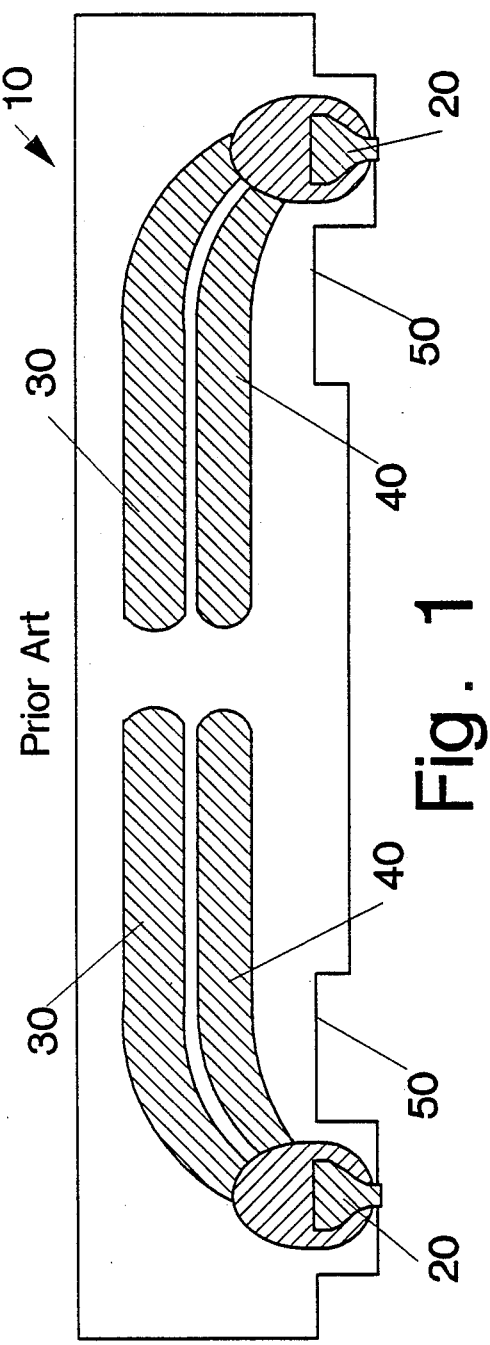
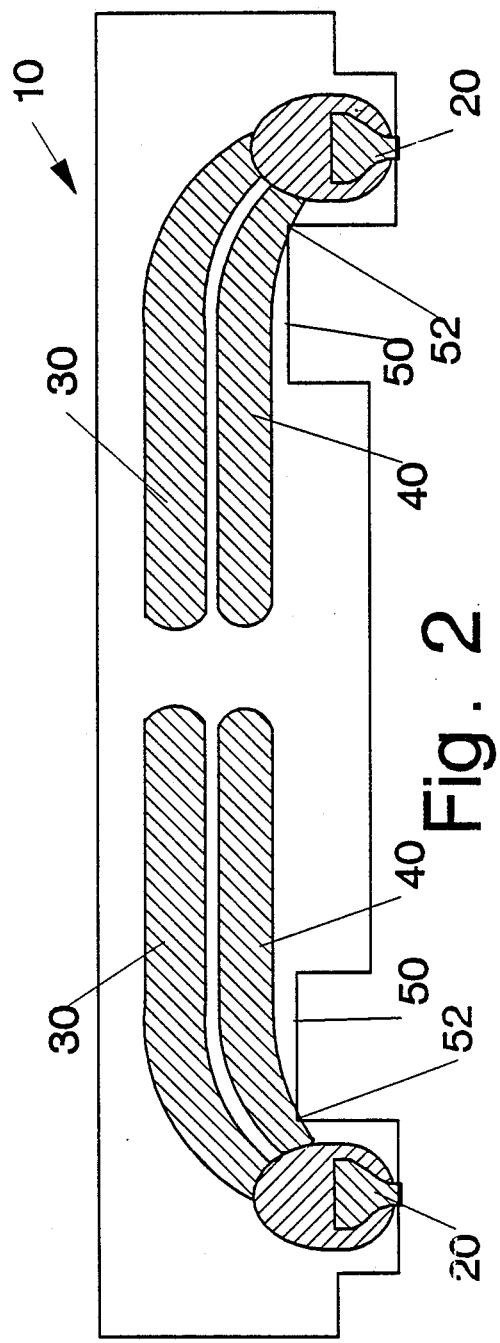

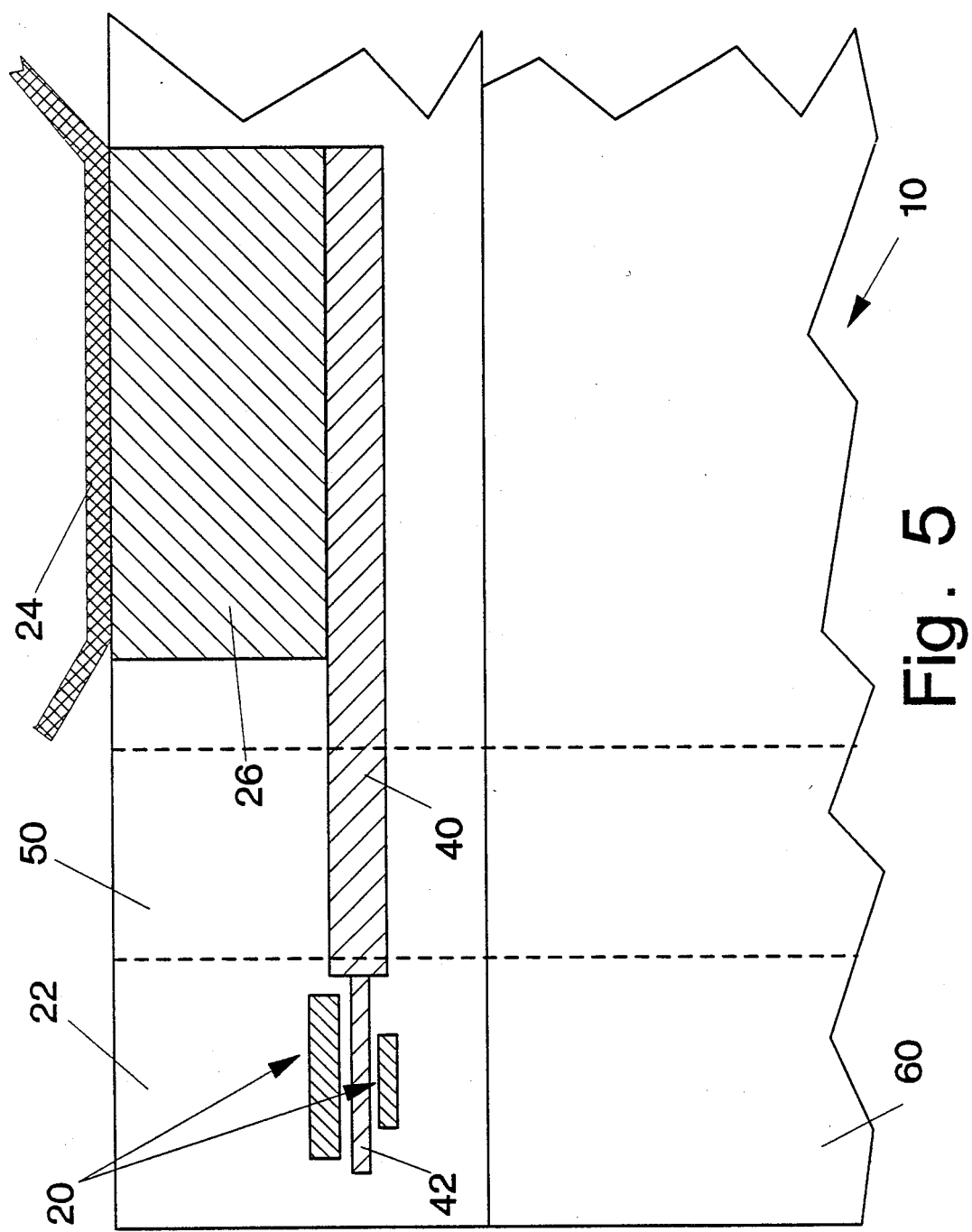

STATIC ELECTRICITY DISCHARGE DEVICE FOR A MAGNETIC HEAD

BACKGROUND OF THE INVENTION

1. Field of the Invention

The invention relates to the field of magnetic recording heads, and more particularly to static discharge devices therefore.

2. Brief Description of the Prior Art

U.S. Pat. No. 4,317,149, issued Feb. 23, 1982, and assigned to IBM, discloses that static electric, present especially during manufacture of a magnetic head, tends to build up on the conductors of the magnetic circuits and discharge through the pole pieces to the adjacent conductive layer of a slider upon which the head is mounted, destroying in whole or in part the pole pieces and insulation properties of the intervening dielectric thereby rendering the head ineffective and sometimes useless. This patent is hereby incorporated by reference as if fully set forth herein. The invention of that patent provided conductors 30 connected between studs 26 (see FIG. 5 of the present application as well) and a lower surface of insulator 22 adjacent slider support 10 so that the discharge took place through these discharge conductors 30 rather than through the pole pieces.

FIG. 1 is a cross sectional view from the rear end of a similar prior art head 10 having structure directly corresponding to the structure of FIG. 3 of the aforementioned IBM patent but without the discharge conductors 30 of that patent. Shown in the figure are the head's magnetic poles 20 which are inductively connected to "comet" conductors 30 and 40, which are in turn connected to studs (shown in FIG. 5) corresponding to studs 26 of FIG. 3 of the above IBM patent. These conductors 30 and 40 each connect to coils 42, shown in FIG. 5, but corresponding to conductors 16 of the aforementioned IBM patent, which induce and sense magnetic flux in the poles 20. The conductors 30 and 40 are not directly connected to poles 20, but rather are electically insulated therefrom. Additionally, recesses 50 are provided to assist the flying characteristics of the head 10.

SUMMARY OF THE INVENTION

The invention comprises alternatively grinding recesses 50 deeper to nick and expose a portion of lower conductor 40, structuring the lower conductor so that it is nicked when the standard recesses 50 are ground, or a combination of the two. By this means, the static electricity buildup on conductors 30 and 40 is discharged through exposed conductor 40 and not through the poles 20 of the head.

BRIEF DESCRIPTION OF THE DRAWINGS

FIG. 1 is a cross-sectional view of a prior art magnetic head viewed from the rear end of the head showing the pole pieces and conductors of two laterally spaced magnetic circuits and the recesses that aid the flying characteristics of the head.

FIG. 2 is a similar cross-sectional view with the recessed deepened to nick and expose a portion of one of the conductors.

FIG. 5 is a partial cross sectional view from the bottom rear end of the head showing the pole pieces, the coil, the lower conductor, the stub and lead wire.

DESCRIPTION OF THE PREFERRED EMBODIMENT

Referring to the prior art head of FIG. 1, recesses 50 are formed in head 10 by a grinding process using a nickel-diamond wheel with a grit size of 15–17 micrometers. The purpose for the recesses is to aid the flying characteristics of the head 10.

In the first embodiment of the invention shown in FIG. 2, the recess grinding step is extended until conductor 40 is nicked and exposed at 52. This results in a deeper recess 50 which may or may not adversely affect head flying characteristics depending on compensations made elsewhere in the head.

Figure 3:
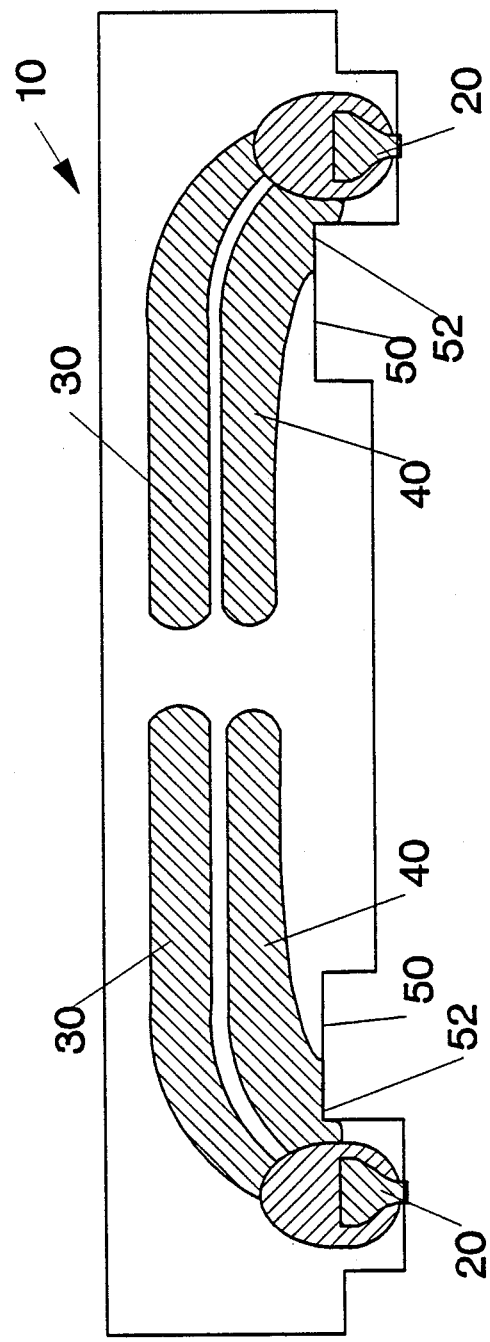
FIG. 3 is a similar cross-sectional view with the lower conductor broadened so that it is exposed when a marginally deeper recess is formed.

To avoid deepening the recesses, lower conductors 40 may be broadened at their base (the point of connection to coils 42 (see FIG. 5)), so that they are substantially exposed at 52 when the standard recesses 50 are ground. This is shown in FIG. 3.

Alternatively, a combination of both broadening the conductors' bases and deepening recesses 50 may be employed. This is also shown in FIG. 3 wherein recesses 50 are marginally deeper than the prior art recesses 50 of FIG. 1.

Figure 4:
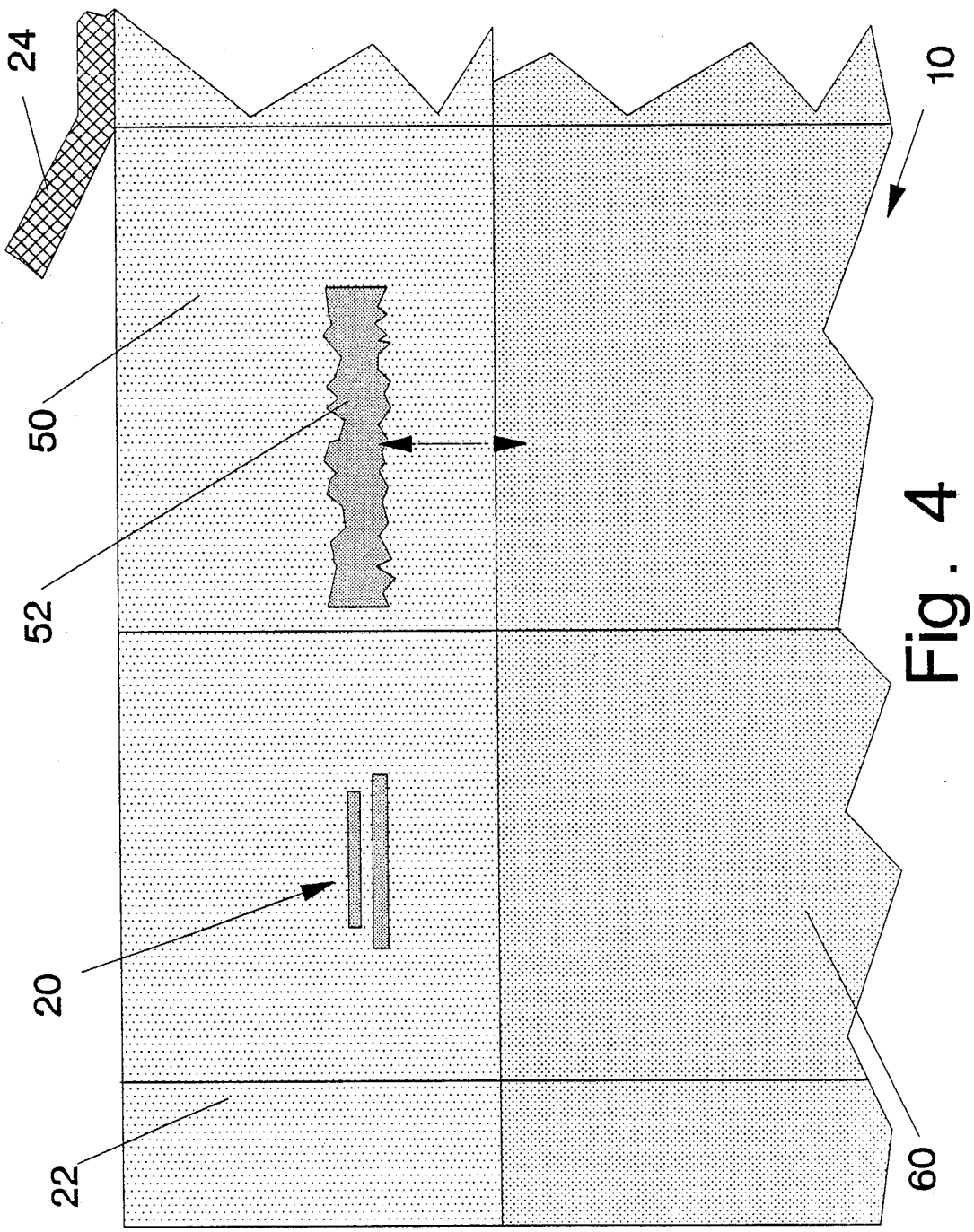
FIG. 4 is a partial plan view of the bottom of the rear end of the head showing the pole pieces, the exposed conductor, and a portion of the conductive slider upon which the magnetic circuits and conductors are mounted.

FIG. 4 is a partial bottom plan view of the rear end of head 10 showing exposed pole pieces 20 and the exposed portion 52 of conductor 40. These are mounted in non magnetic dielectric material 22 so that they are electrically insulated from electrically conductive slider 60 upon which the non magnetic dielectric material is mounted. Also shown in the figure is a lead wire 24, which connects to conductor 40 as in the prior art IBM patent.

As can be seen from this figure, the exposed portion 52 of conductor 40 is much thicker than pole pieces 20 because the pole pieces are conventionally deliberately made thin at their tips to increase resolution. However, the distance between the exposed conductor 52 and slider 60 is approximately the same as that of the pole pieces 20. As the surface area of conductors 30 and 40 (which are connected to each other) is much larger than the surface area of pole pieces 20, much more static electric charge accumulates on them and dischargre takes place between the exposed portion 52 of conductor 40 and slider 10 (as indicated by the double arrow) rather than through the relative smaller, lower-charged pole pieces 20.

Moreover, the rough grinding process used to expose the conductor 52 makes the edges of the conductor jagged as shown in the figure. This creates points of high static electric charge, which creates a path of lesser resistance for electrical discharge than a path through inductively connected pole pieces 20 which have smoothe, lapped surfaces. In this regard, the extreme rough grind of the recess provides a much beter discharge path than relatively smoothe conductors 30 of the aforementioned IBM patent.

FIG. 5 show a cross sectional view of a slightly larger portion of the rear end of head 10 as that shown in FIG. 4, again viewed from the bottom of the head. Here at least a portion of coils 42 are mounted between pole pieces 20 and are connected to the conductors, the lower one 40 of which is shown in the figure. In turn the conductors are connected to stubs 26, which connect to lead wires 24 on the trailing surface of the head 10.

I claim:

1. In a magnetic head having a non magnetic dielectric material with an outer surface, a set of magnetic circuits, including at least one pole exposed at said outer surface, and a plurality of conductors extending from said magnetic circuits through said non magnetic dielectric material, said non magnetic dielectric material mounted on a conductive body, the improvement comprising:

a recess formed in said non magnetic dielectric material sufficiently deep to expose a portion of one of said conductors to provide a static electricity discharge path between said exposed portion of said one of said conductors and said conductive body along said outer surface of said non magnetic dielectric material.

2. In a magnetic head having a non magnetic dielectric material with an outer surface, a set of magnetic circuits, including at least one pole exposed at said outer surface, a plurality of conductors extending from said magnetic circuits through said non magnetic dielectric material, said non magnetic dielectric material mounted on a conductive slider, and at least one recess formed in said non magnetic dielectric material, the recess aiding the flying characteristics of said slider, the improvement comprising:

deepening the recess to expose a portion of one of said conductors to provide a static electricity discharge path between said exposed portion of said one of said conductors and said conductive slider along said outer surface of said non magnetic dielectric material.

3. In a magnetic head having a non magnetic dielectric material with an outer surface, a set of magnetic circuits, including at least one pole exposed at said outer surface, a plurality of conductors extending from said magnetic circuits through said non magnetic dielectric material, said non magnetic dielectric material mounted on a conductive slider, and at least one recess formed in said non magnetic dielectric material, the recess aiding the flying characteristics of said slider, the improvement comprising:

broadening at least one of said conductors adjacent the recess to expose a portion of said one of said conductors to provide a static electricity discharge path between said exposed portion of said one of said conductors and said conductive slider along said outer surface of said non magnetic dielectric material.

4. In a magnetic head having a non magnetic dielectric material with an outer surface, a set of magnetic circuits, including at least one pole exposed at said outer surface, a plurality of conductors extending from said magnetic circuits through said non magnetic dielectric material, said non magnetic dielectric material mounted on a conductive slider, and at least one recess formed in said non magnetic dielectric material, the recess aiding the flying characteristics of said slider, the improvement comprising:

deepening the recess and broadening at least one of said conductors adjacent the recess to expose a portion of said one of said conductors to provide a static electricity discharge path between said exposed portion of said one of said conductors and said conductive slider along said outer surface of said non magnetic dielectric material.

* * * * *